(No Model.)
J. L. BAILLIE.
INSTRUMENT FOR MEASURING DISTANCES.
No. 499,950. Patented June 20, 1893.
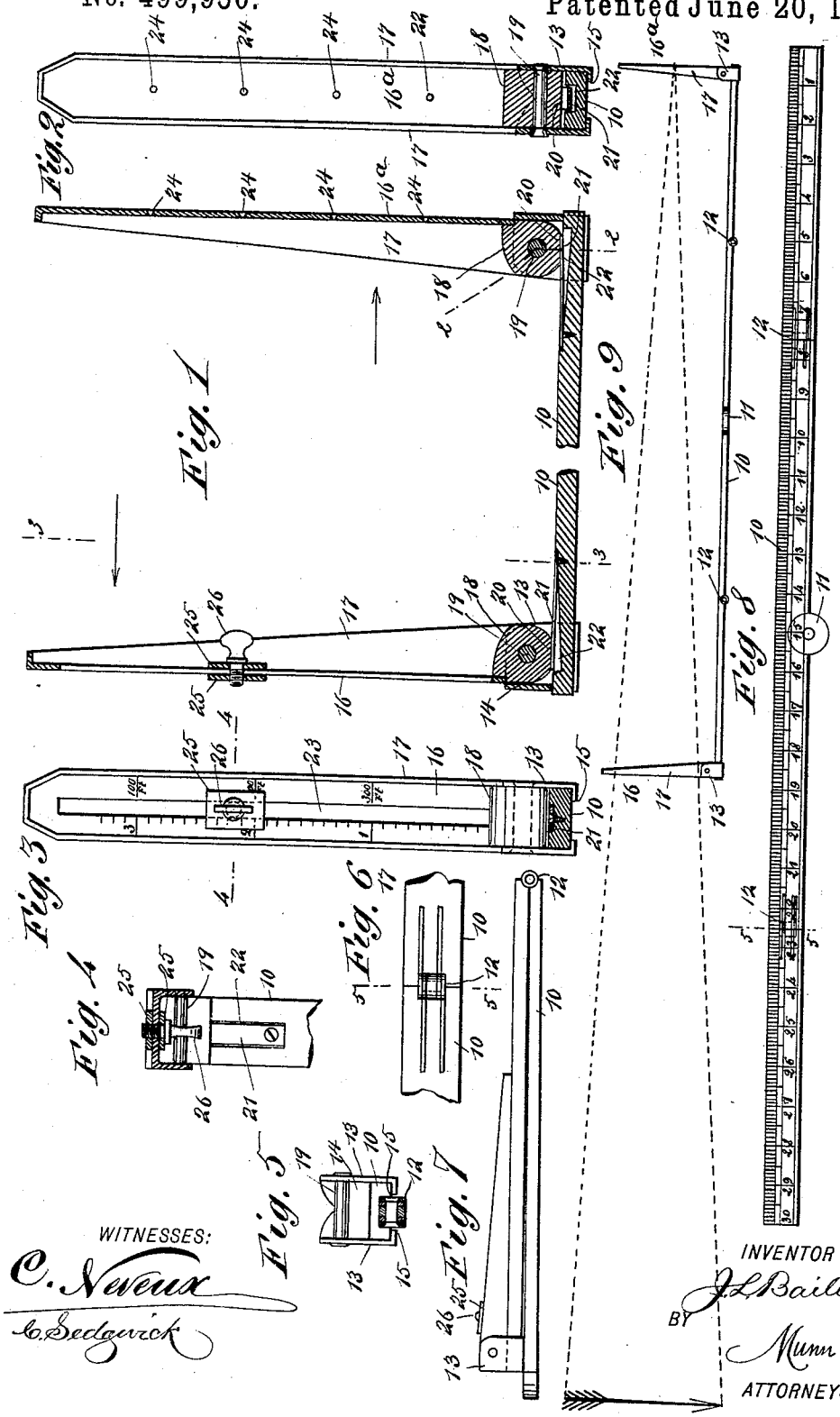
WITNESSES:
C. Neveux
C. Sedgwick
INVENTOR
J. L. Baillie
BY
Munn & Co.
ATTORNEYS.

UNITED STATES PATENT OFFICE.

JAMES L. BAILLIE, OF SHAWNEE, OHIO.

INSTRUMENT FOR MEASURING DISTANCES.

SPECIFICATION forming part of Letters Patent No. 499,950, dated June 20, 1893.

Application filed November 17, 1892. Serial No. 452,277. (No model.)

*To all whom it may concern:*

Be it known that I, JAMES L. BAILLIE, of Shawnee, in the county of Perry and State of Ohio, have invented a new and Improved Instrument for Measuring Distances, of which the following is a full, clear, and exact description.

My invention relates to improvements in measuring instruments, and the object of my invention is to produce an instrument of which an ordinary pocket rule forms a part, and which is adapted to measure linear distances and vertical heights, and which is also adapted for use in drawing or painting and enables a draftsman or artist to produce the principal objects in their exact proportional sizes.

A further object of my invention is to produce a tool of the character described, which may be folded into a small compass so as to be carried in the pocket, and which may be cheaply made and easily used.

To this end, my invention consists in certain features of construction and combinations of parts, which will be hereinafter described and claimed.

Reference is to be had to the accompanying drawings forming a part of this specification, in which similar figures of reference indicate corresponding parts in all the views.

Figure 1 is a broken longitudinal section of the device in position for use. Fig. 2 is a cross section on the line 2—2 in Fig. 1, looking in the direction of the arrow. Fig. 3 is a cross section on the line 3—3 in Fig. 1, looking in the direction of the arrow. Fig. 4 is a broken sectional plan on the line 4—4 in Fig. 3. Fig. 5 is a cross section on the line 5—5 in Figs. 6 and 8. Fig. 6 is a broken inverted plan of two rule members, showing the construction of the hinge. Fig. 7 is a side elevation of the device in folded position. Fig. 8 is a plan of the extended rule adapted for use in connection with other parts of the device, the rule being of the ordinary kind except for its hinges, which will be described below. Fig. 9 is a diagrammatic view showing the manner in which the instrument is used.

My invention enables the angles necessary to measure heights and distances to be readily ascertained so that said heights and distances may be quickly and accurately estimated.

The novel portions of the device are preferably used with an ordinary pocket rule, although they may be used with any suitable instrument which will afford a base or support for the height and distance measuring devices which will be hereinafter described.

The rule 10, is substantially of the usual kind, having the middle hinge 11, which swings on a plane parallel with the rule members, and the hinges 12 which enable the members to be folded at right angles to the plane of the hinge 11, these hinges 12 being made narrow, as shown best in Figs. 5 and 6, so as to occupy only the middle portion of the members and permit the slide 13 to pass by them. A slide 13 is mounted on each end of the rule, this slide being provided with opposite side pieces and a connecting back 14, the side pieces and back being arranged at right angles to the rule, and the back is at right angles to the side pieces and forms a support for the vertical scales, which will be described presently.

The slides 13 clasp the end portions of the rule, but are provided with slots 15 (see Fig. 5) which enables them to slide over all the hinges 12. One of the slides carries an upwardly extending scale 16, which is adapted to project at right angles to the member 10, and the slide on the opposite end of the rule is provided with a similarly shaped sight plate 16$^a$, which is connected with the slide in the same way that the scale 16 is connected with its slide. The slide 16 and the sight plate 16$^a$, have each side flanges 17, which give them the necessary strength and which taper from the base portion. Between the flanges 17 and at the base, is a bearing block 18, which is pivoted on a pin 19 in the slide 13, and which has a flattened bottom 20 adapted to be pressed by a spring 21, which is held in a recess 22 in the rule 10. The pressure of the spring enables the scale 16 or the sight plate 16$^a$ to be held in a preferably vertical position, that is, to be perpendicular to the rule 10. For convenience in reading the top of the slide 13 comes opposite zero on the scale 16.

The scale 16 is provided with a longitudinal slot 23, which is located in the middle, and on one side of the slot the scale is marked to represent feet in hundredths and on the other side to represent inches and tenths thereof, showing the distance when using a ten foot pole. The scale is preferably graduated to one in three hundred, although the arrangement is arbitrary and may be changed if desired. The sight plate 16ª instead of being slotted, is provided at intervals with peep holes 24, which are in the same vertical plane as the slot 23 in the scale, and the operator peeps through these holes and through the slot, a hole being used which has the right relation to the slot and to the object sighted.

A slide 25, is held to move on the scale 16, this slide consisting of two clamping plates arranged on opposite sides of the scale and united by a set screw 26, by tightening which the plates are forced together and held upon the scale.

When applied to a rule, it will be readily seen that the slides 13 and the sight plate and scale may be moved to and from each other so as to bring them into the required relative positions, or the said sight plate and scale may be folded down flatwise upon the rule, or held perpendicular thereto, but when the scale is to be folded downward upon the rule, it is necessary to drop the slide 25 on the scale so that the slide will be held between the widest portions of the flanges 17. When the scale and sight plate are folded flatwise and the rule folded up in the usual manner, the sight plate and scale will lie side by side in one end portion of the rule, as shown in Fig. 7.

The operation of the instrument will be understood by reference to Fig. 9. By reference to the dotted lines in said figure, it will be seen that by sighting through one of the peep holes and through the slot 23, so as to bring an object to be measured within range, the object sighted will represent one side of a triangle, and the converging lines extending from the top and bottom of said object to the peep-hole in the sight plate will represent the two other sides of a triangle, so that a triangle being projected, the distance may be measured in the ordinary way, and the measurement is simplified by the use of the scale. The slide 25 is usually held at zero, that is, at the bottom of the scale, and in using the instrument the sight plate and scale are adjusted so that a person by peeping through one of the peep-holes 24 and through the slot 23, will just bring the object represented by the arrow in Fig. 9 within the range of the slot. If the height of the object represented by the arrow is known, and the distance to the said object is to be found, it is only necessary then to multiply the height by the distance from the scale to the sight plate, and divide the product by the length of the slot in the scale. To ascertain the height of an object, the distance being known, then focus object as above described, multiply the distance by the length of the opening in the graduated scale, and divide by the distance between the scale and sight plate.

To ascertain the relative heights of things so as to produce them in proper proportions on a picture or drawing, the sight plate and scale are placed quite near together, so that a full view of the object is easily obtained, the base line between the eye and the object extending through the slot 23 opposite the zero mark, and the slide 25 is then adjusted and fastened opposite the line leading from the eye to the top of said object. The operator then makes a note of the position of the slide on the scale, sights another object in the manner described, adjusts the slide to the height of said object, and so on with any desired number of objects, and then by laying the scale on its side and marking from the zero line to the several places made a note of on the scale, the exact relative widths of the several objects will be reproduced.

Having thus described my invention, I claim as new and desire to secure by Letters Patent—

1. A pocket measuring instrument comprising a folding support formed of hinged sections, slides mounted on the support to be moved toward and from each other thereon and folding sight and scale plates hinged to the respective slides, substantially as set forth.

2. A pocket measuring instrument comprising a folding support formed of hinged sections, slides movable toward and from each other on said support a longitudinally slotted scale plate hinged to one slide and provided with a slide having an adjusting screw extending through said slot, and the sight plate hinged to the other one of the first named slides and provided with a series of perforations, substantially as set forth.

3. The combination, with a rule, of slides held to move longitudinally thereon, a longitudinally slotted and graduated scale hinged in one of the slides, and a sight plate hinged in the opposite slide and provided with peep-holes adapted to align with the slot in the scale, substantially as described.

JAMES L. BAILLIE.

Witnesses:
  CHAS. T. GRIFFITHS,
  CHARLES RUSK.